July 12, 1949. W. G. HOELSCHER 2,475,665
DRILL SPINDLE DRIVING MECHANISM
Original Filed July 28, 1939 9 Sheets-Sheet 2

INVENTOR.
BY William D. Hoelscher
Wood, Arey, Herron & Evans
ATTORNEYS

July 12, 1949.　　　W. G. HOELSCHER　　　2,475,665
DRILL SPINDLE DRIVING MECHANISM
Original Filed July 28, 1939　　　9 Sheets-Sheet 3

INVENTOR.
William G. Hoelscher
BY
Wood, Arey, Herron & Evans
ATTORNEYS

July 12, 1949. W. G. HOELSCHER 2,475,665
DRILL SPINDLE DRIVING MECHANISM
Original Filed July 28, 1939 9 Sheets-Sheet 4

INVENTOR.
BY William G. Hoelscher
ATTORNEYS

July 12, 1949.  W. G. HOELSCHER  2,475,665
DRILL SPINDLE DRIVING MECHANISM
Original Filed July 28, 1939   9 Sheets-Sheet 5

INVENTOR.
William G. Hoelscher
BY Wood, Arey, Herron & Evans
ATTORNEYS

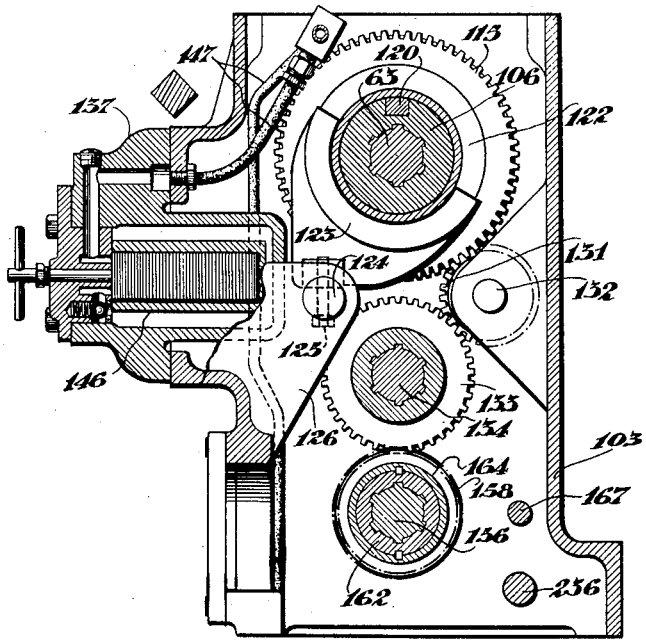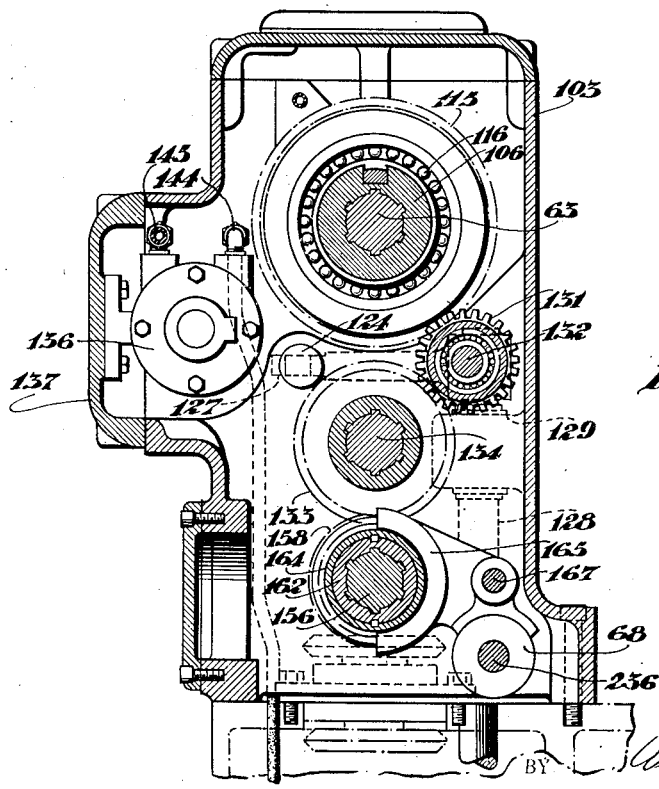

July 12, 1949.  W. G. HOELSCHER  2,475,665
DRILL SPINDLE DRIVING MECHANISM
Original Filed July 28, 1939  9 Sheets-Sheet 8
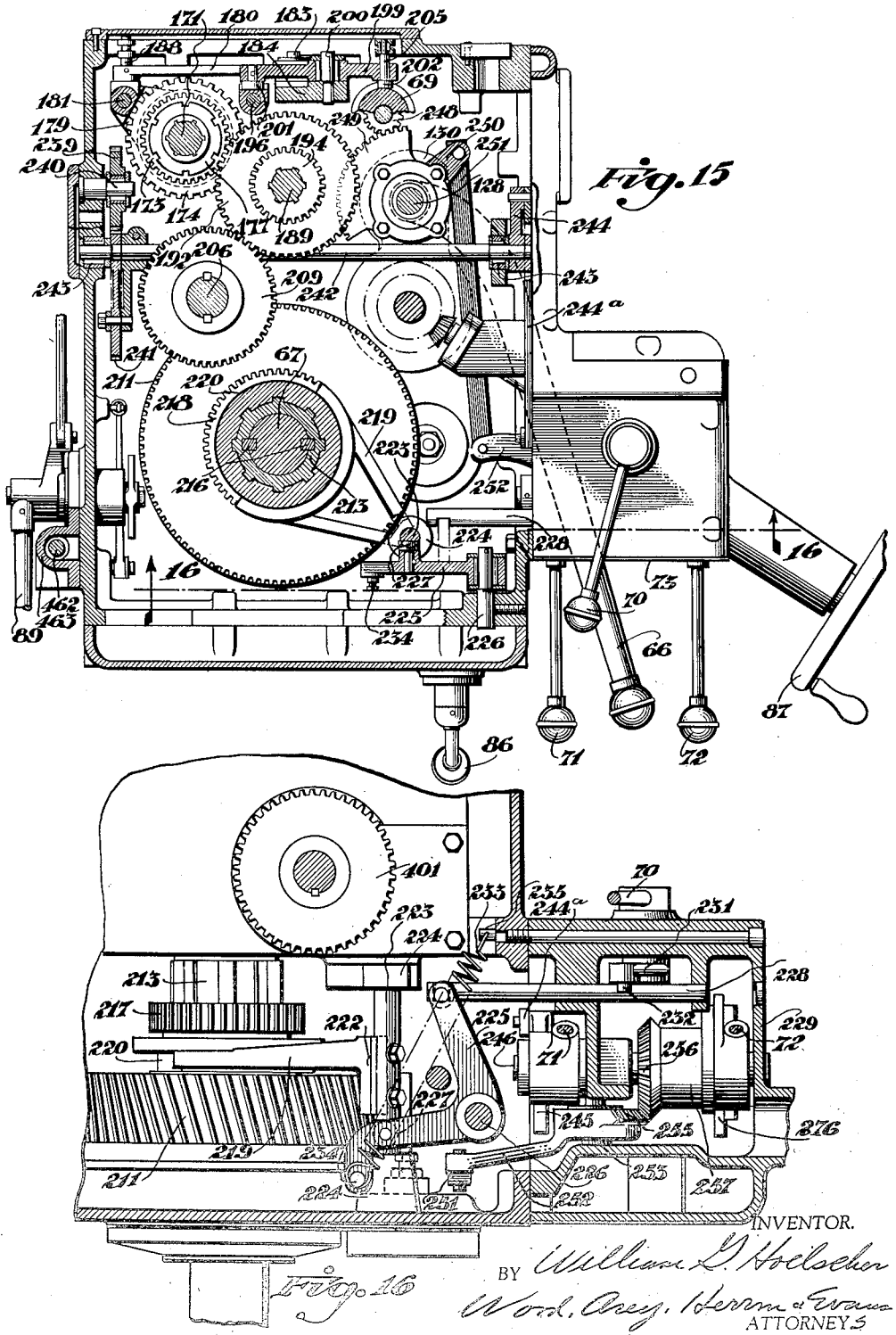
INVENTOR.
BY William G. Hoelscher
ATTORNEYS

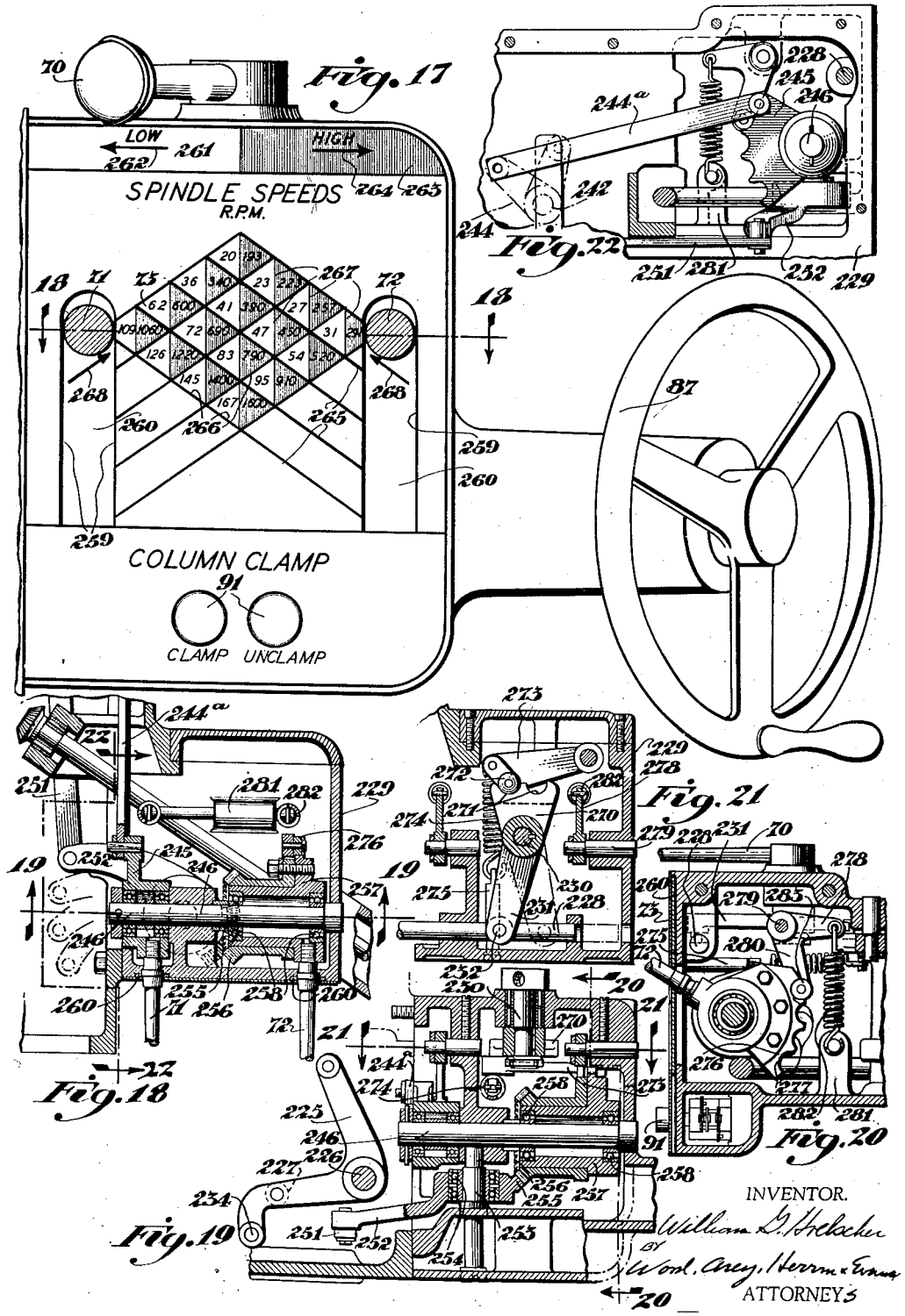

Patented July 12, 1949

2,475,665

UNITED STATES PATENT OFFICE 2,475,665

DRILL SPINDLE DRIVING MECHANISM

William G. Hoelscher, Cincinnati, Ohio, assignor to The American Tool Works Company, Cincinnati, Ohio, a corporation of Ohio Original application July 28, 1939, Serial No. 287,132. Divided and this application April 7, 1945, Serial No. 587,068

7 Claims. (Cl. 74—473)

This invention relates to machine tools and is particularly directed to radial drills. More specifically, the invention is directed to improvements in the tool spindle operating mechanism.

This application is a division of my Patent No. 2,384,744, issued September 11, 1945 for Drill spindle driving mechanism.

It has been the object of the present inventor to provide an improved arrangement of the power shaft which delivers the power generally to the drill head of the radial drill. The improvement makes it possible to interchange without difficulty the main driving gears, which connect the motor to the head driving shaft. These gears are disposed in a position where they are conveniently accessible and where their removal does not require any substantial disassembly. Accordingly, in the event that the operator desires a general increase or decrease in speed to the head, he can quickly remove the component driving gears and replace the same with another set of component gears of the desired ratio.

It has been another object of the present inventor to provide spindle driving and feeding transmissions, each shifted by means of a pair of levers for providing the appropriate transmission connections. In each instance, one of the levers of the pair is for shifting between two ranges and the other is for shifting to the specific speeds or feeds within these ranges.

It has been the further object in this arrangement to provide these levers so that they are more conveniently shifted and so that the operator may determine the position of the respective transmissions by means of improved dials, greatly facilitating correct reading. In both transmissions, that is speed and feed, the dials provide panels having light and dark zones for the respective ranges. When the specific feed or speed control lever is in position indicating the speeds within a particular panel, the operator can readily determine whether or not it is low or high speed by observing the position of the range shifting lever relative to its panel which includes, as well, the light and dark zones. Thus, it is possible to read the speeds and feeds directly adjacent the levers, for the levers actually indicate the feeds or speeds by virtue of the positions of the levers relative to the panels.

It is a further object of the inventor to provide gear shifting means for the transmission of the spindle wherein a number of gears may be shifted from a single cam and wherein the gears shift easily and without frictional resistance. This is accomplished by counterbalancing means associated with each vertically supported gear.

It has been a still further object of the present inventor to provide an improved arrangement of gears whereby fewer gears are required for a given speed. The structure is more compact and less mechanism is required. A structure accomplishing this result may consist of a single intermediate shaft, effective for increasing speeds from one to four by the use of a cluster of three gears on the intermediate shaft and clusters of two gears each on the adjacent shafts. One of the adjacent clusters of two gears is shiftable relative to the cluster of three gears to accomplish two speeds, or may be shifted again relative to the cluster of three gears after the cluster of three gears has been moved to a second gear coupling position, thereby accomplishing two more speeds.

Other objects and certain advantages of the invention will be more fully apparent from the description of the accompanying drawings in which:

Figure 9 is a sectional view taken on line 9—9, Figure 8, further illustrating the transmission.

Figure 10 is a sectional view taken on line 10—10, Figure 8.

Figure 6:
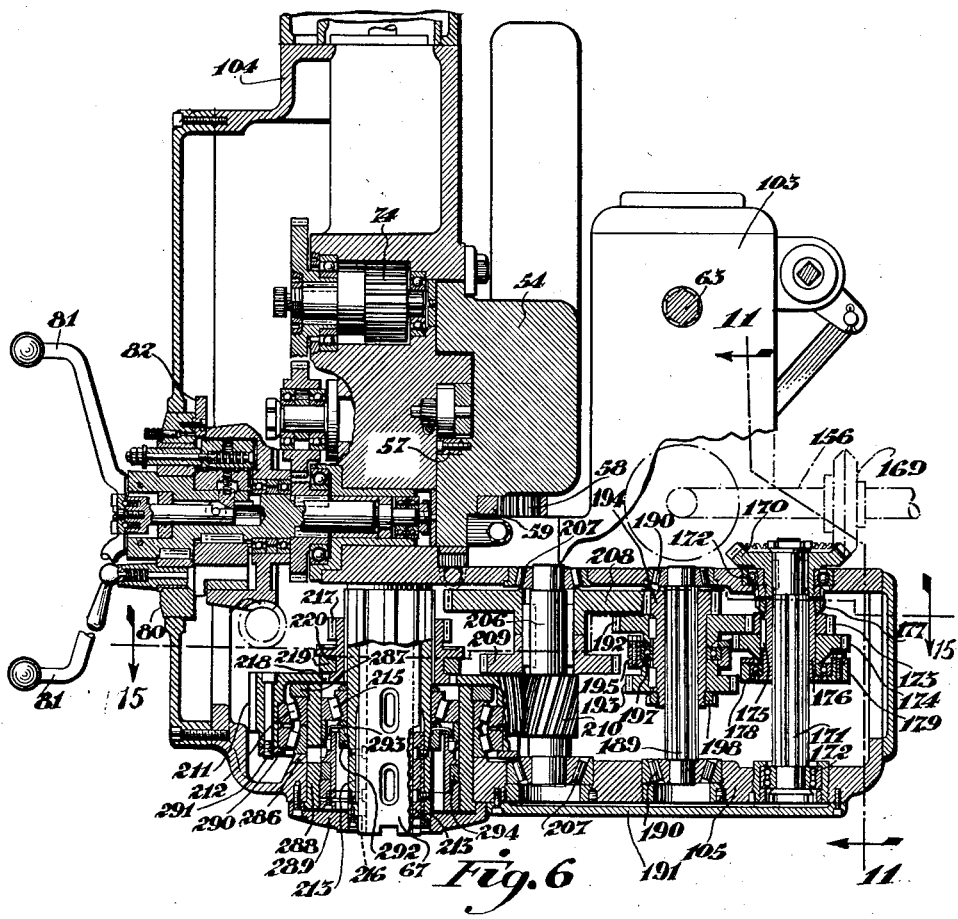
Figure 6 is a sectional view taken on line 6—6, Figure 1, illustrating the driving and feeding means for the spindle.

11—11, Figure 6, showing a portion of the speed gear shifting means.

Figure 11:
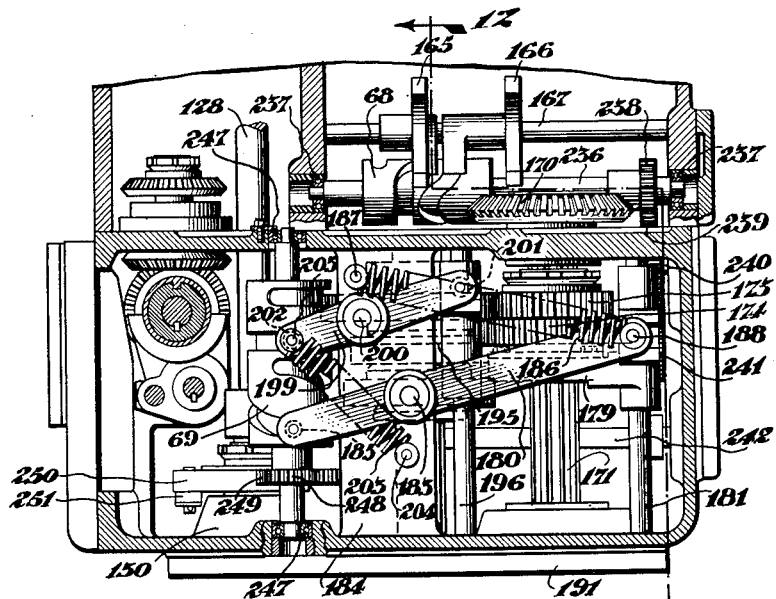
Figure 11 is a sectional view taken on line
Figure 12:
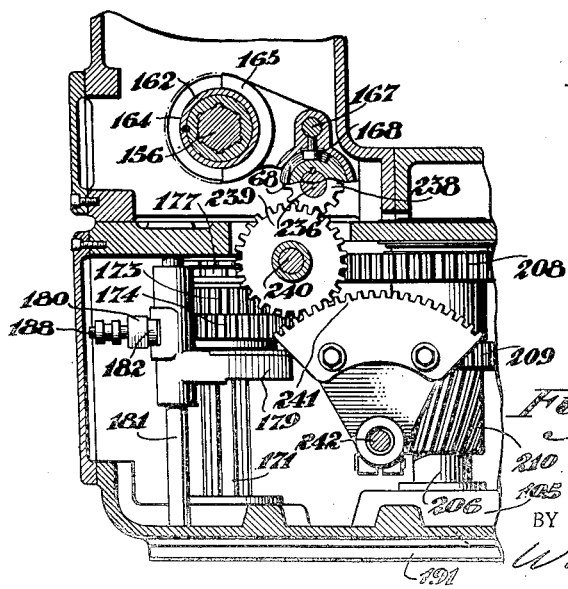

Figure 12 is a sectional view taken on line 12—12, Figure 11, showing the means for rotating one of the shifting cams.

Figure 13:
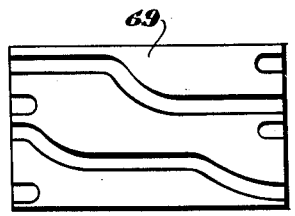

Figure 13 is a view illustrating a development of one of the speed gear shifting cams.

Figure 14:
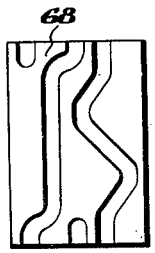

Figure 14 is a view illustrating a development of the other of the speed gear shifting cams.

Figure 15 is a sectional view taken on line 15—15, Figure 6, showing the gearing at the base of the head.

Figure 16 is a sectional view taken on line 16—16, Figure 15, showing part of the speed gear shifting apparatus.

Figure 17 is an enlarged fragmentary front view of a portion of the head showing the dial and levers for spindle speed changes.

Figure 18 is a sectional view taken on line 18—18, Figure 17, showing the connection of shifting levers to the shifting means.

Figure 19 is a sectional view taken on line 19—19, Figure 18, further showing the shifting connections.

Figure 20 is a sectional view taken on line 20—20, Figure 19.

Figure 21 is a sectional view taken on line 21—21, Figure 19.

Figure 22 is a sectional view taken on line 22—22, Figure 18.

The general construction of the radial drill, in which the present improvements are disclosed, is as follows: A base 50 has a stump 51 rising from one end thereof. A column 52 is rotatably mounted on the stump and has a cap 53 attached to its upper end. An arm 54 is vertically slidably mounted on the column 52. This arm may be raised or lowered so as to place the arm in the proper position for locating the drill at the proper height, relative to the work. The work is mounted on the base 50. The arm is supported and elevated by means of a screw 55 depending from the cap 53 of the column.

A drill head 56 is slidably mounted for longitudinal movement on the arm 54, which projects radially from the column. For this purpose, the arm is provided with a rail 57 along its front face. A driven pinion 58 (Figure 6) engages a rack 59 fixed along the rear face of the rail. This pinion is rotated either by power or by hand through means disclosed and claimed in my Patent No. 2,295,516, issued September 8, 1942.

The power for the drill is derived from an electric motor 60, mounted on the short end of the arm. The power is first directed through a shaft 61 into a gear box 62, containing the arm elevating gearing and its control means, disclosed and claimed in a copending application. From the shaft 61, the power is carried without break to a splined shaft 63, which traverses the drill head and is supported at its outer end in a bracket 64 on the outer end of the arm. Within the drill head the power is taken from the shaft 63 through reversing clutches 65—65 (Figure 8) directly controlled by means of a main power control lever 66 for the drill head.

From the reversing clutches 65—65, the power is delivered to the spindle 67 through speed control gearing. The shifting of this gearing for change of speed is accomplished by means of lever operated cams 68, 69. The system provides for thirty-two speeds. A lever 70 (Figure 17) provides for shift alternately to high and low ranges. Levers 71—72, movable with respect to a dial plate 73, shift the cams for shifting the appropriate gears in the selected ranges, as explained hereinafter.

Figure 1:
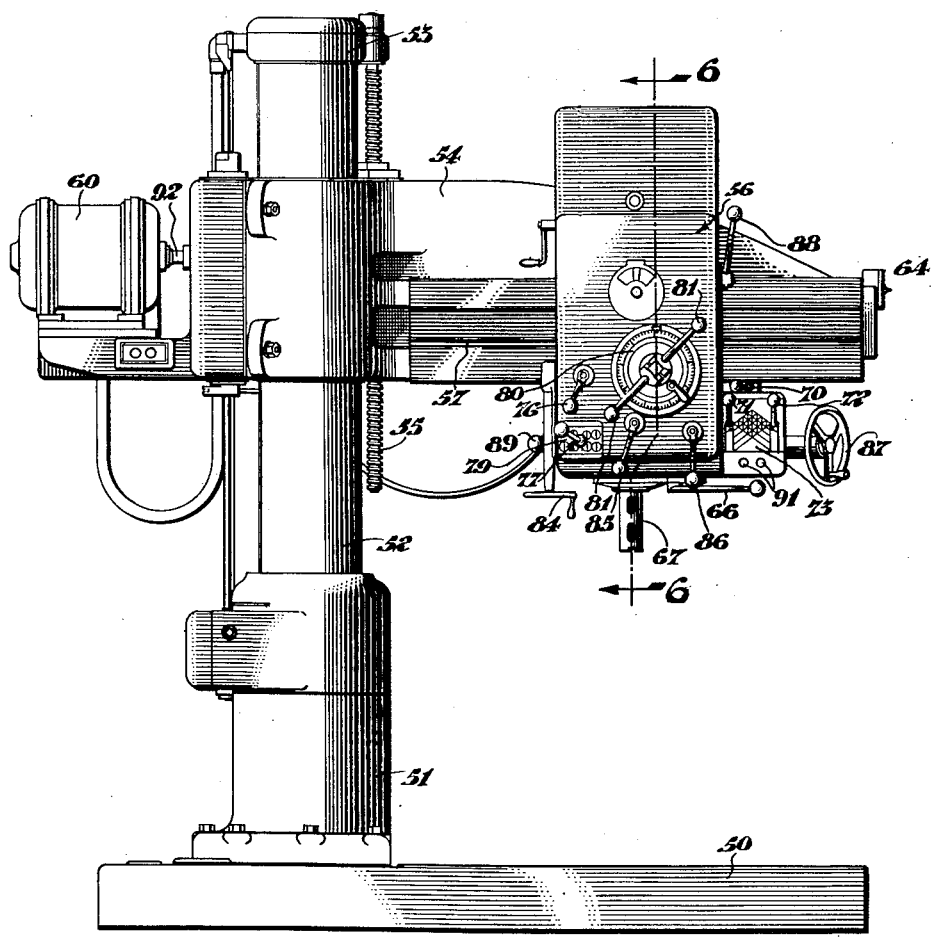
Figure 1 is a front view of a radial drill, incorporating the present invention.
Figure 2:
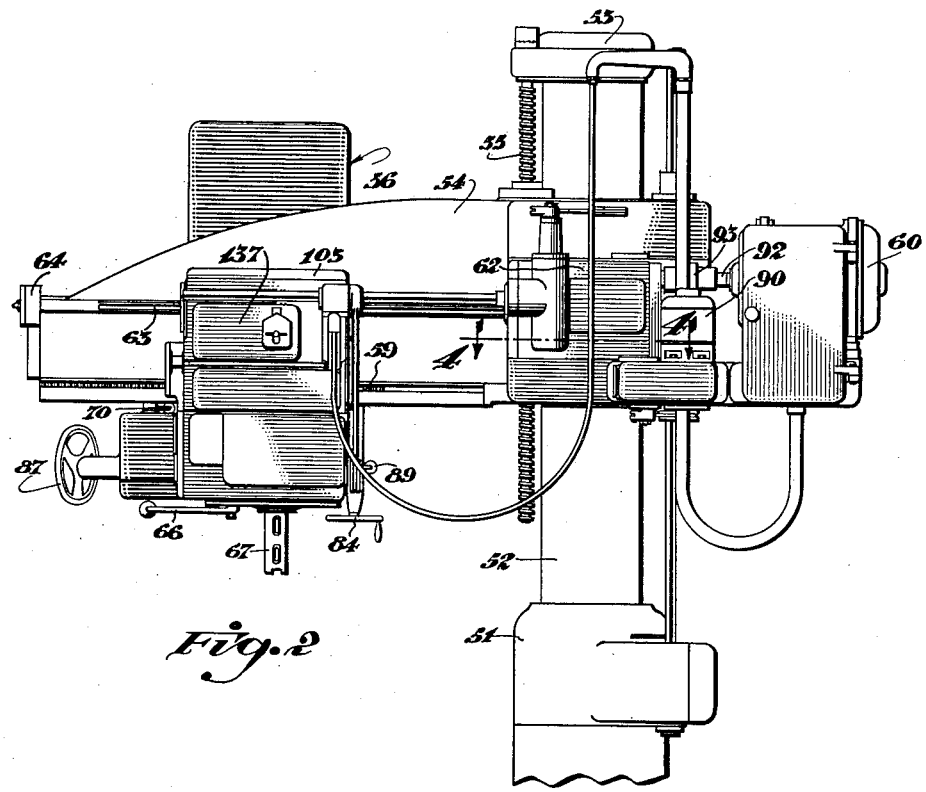
Figure 2 is a rear view of the radial drill with the base broken away.
Figure 3:
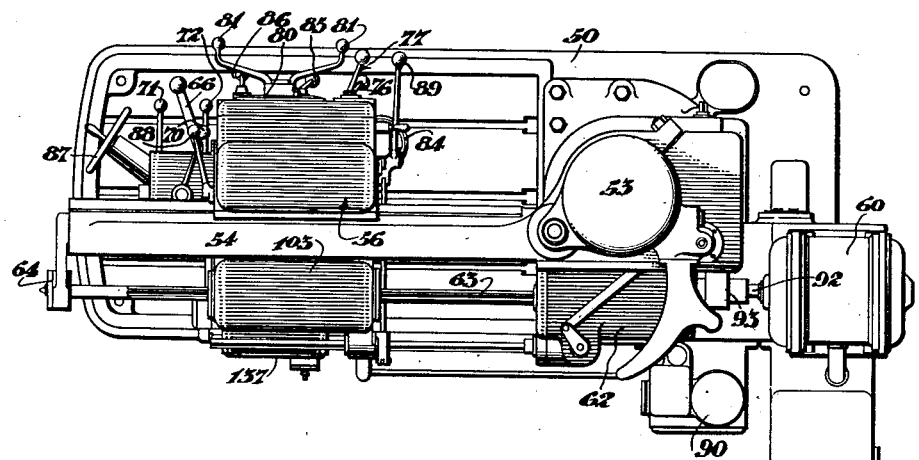
Figure 3 is a top plan view of the radial drill.
Figure 4:
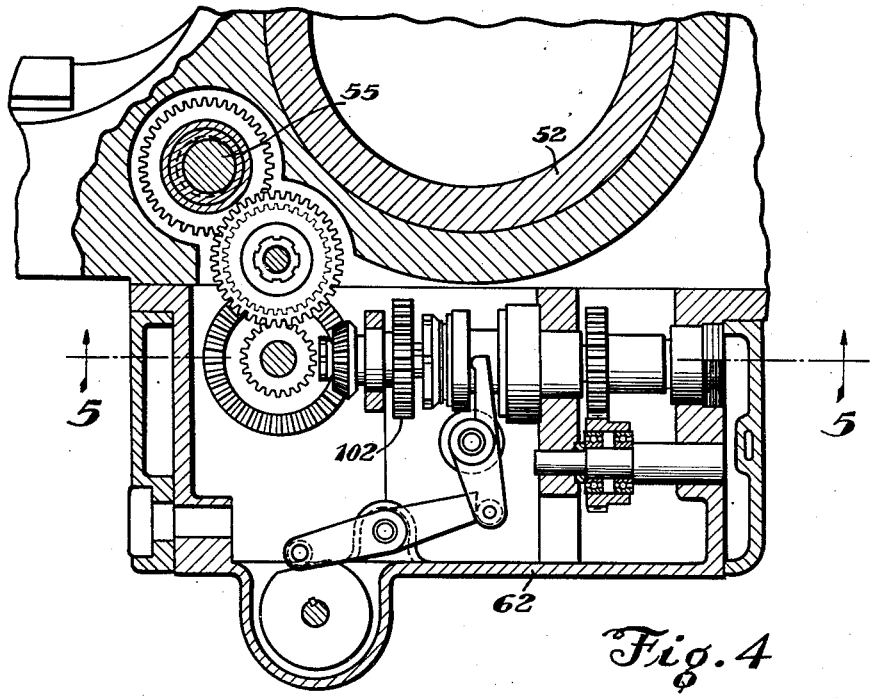
Figure 4 is a sectional view taken on line 4—4, Figure 2.

From the spindle the drive proceeds through feed change gears to the spindle 67. This feed gearing, providing sixteen feed changes, is controlled for these changes by means of levers 76—77 at the face of the head (Figure 1). The upper of these levers effects shift from low to high range, or vice versa. The lower lever 77 accomplishes the changes in the respective ranges, as indicated on a dial 79. The feed-actuating and control mechanism is described here in a general manner, being fully disclosed in my Patent No. 2,384,744, issued September 11, 1945.

The amount of feed is controlled by means of a setting and indicator dial 80. The feed connection is controlled manually by means of levers 81—81 (Figure 1), and automatically, by means of a dog not shown herein, but also disclosed in Patent No. 2,384,744 identified above. This patent also shows dogs on the variable counterbalance additionally control the spindle feed, keeping it within normal limits by automatically stopping the feed, regardless of the hand setting of the feed dial. A hand wheel 84 provides for manual feed. A lever 85 couples either the hand wheel or the power feed.

Power traverse of the head is controlled by means of a lever 86. A hand wheel 87 is provided for traversing the head by hand. A lever 88 operates the head clamp. Lever 89 controls the clamping of the arm to the column and the elevation of the arm. The column is clamped by means of an electric motor 90 on the arm. This motor is controlled by means of clamp and unclamp push buttons 91—91 on the head just below the speed indicator dial. Separate patents have been issued, namely, Nos. 2,278,262, issued March 31, 1942, and 2,295,516, issued September 8, 1942, directed to the veriable counterbalance mechanism and the head traversing mechanism and other features of the radial drill disclosed herein. The present structure involves primarily the spindle drive and speed change mechanism, and, for this reason, the various other components of the drill structure are not disclosed in detail.

The power to the head

Figure 5:
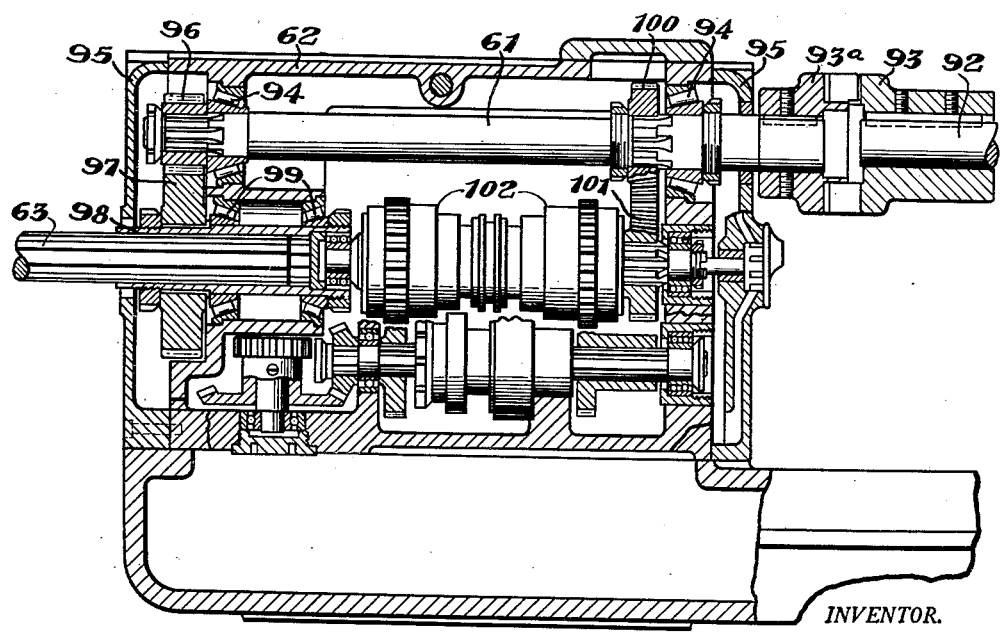
Figure 5 is a sectional view taken on line 5—5, Figure 4.

The main electric motor 60 is bolted on the short extension of the arm. Its shaft 92 carries a coupling element 93 in toothed connection with a coupling element 93a fixed on the extended end of the power shaft 61, journaled in the gear box 62 (Figure 5). The shaft 61 is journaled in bearings 94—94 in the respective end walls of the gear box. The casing or box 62 is attached to the arm and includes cover plates 95—95 at its respective ends. A pinion gear 96 is attached to the outer end of the power shaft. This gear is constantly in mesh with a gear 97, fixed to a sleeve 98, journaled in spaced bearings 99—99 in a thickened end wall of the casing. The gears 96 and 97 may be removed quite easily and replaced with gears of different size for changing the gear ratio. In other words, if a faster speed is desired the gear 96 may be provided in a larger size and the general speed delivered to the head is correspondingly faster. This interchangement of gears is accomplished by removing the cover 95, loosening the end bracket of the shaft 63 and pulling the shaft from the sleeve 98. Thereupon the nuts holding the gears are removed, the gears replaced, and the parts reassembled.

The power is transmitted from the shaft 61 to the arm elevating mechanism through gear 100, fixed to the shaft 61, to gear 101 on the reversing shaft assembly 102. The details of this elevating mechanism are disclosed elsewhere and form no part of the present application.

The sleeve 98 provides a splined socket for the driven end of the splined power shaft 63. The outer end of the shaft 63, as stated, is rotatively journaled in the bracket 64, fixed on the outer end of the arm, and is thus disposed along the back of the arm parallel therewith.

The head 56 includes a rear casing section 103 (Fig. 6) which houses the reversing gearing for the spindle, and part of the spindle driving transmission. The head generally described is of the conventional form (Figure 6), that is to say, includes the rear casing 103, a front casing 104 in which the drill spindle is vertically disposed, and a lower transmission casing or extension 105 of the front casing, connecting the front and rear casings. The arm passes through the space thus provided between the front and rear casings. The rear face of the front casing includes the guide grooves and supporting means which engage upon the rail of the arm.

The splined shaft 63 passes through a long splined sleeve 106 (Fig. 8), the ends of which are journaled in bearings 107—107, carried by respective bearing brackets 108—108. These brackets have circular flanges 109 secured to the ends of the casing 103 by means of screws 110. The assembly of the sleeve in the bearings is maintained by means of washers 111, engaging the clutches against shoulders on the sleeve at the inner side of each clutch, and nuts 112 screwed on the ends of the sleeve and fastening the inner races of the bearings against the washers. The bearing brackets include felt packing rings 113 surrounding and sealing the ends of the sleeve. One of the brackets includes a removable bushing 114, providing access to one of the nuts 112, so as to permit removal of the nut 112 and withdrawal of the sleeve through the other end of the casing.

Reversing driving gears 115—115 are loosely rotatively mounted on the sleeve 106 toward the respective ends thereof. These gears in each instance are journaled on spaced bearings 116—116, fixed on the driving sleeve. Within each gear is a clutch 65. An element 117 of each clutch is keyed to the driving sleeve between the spaced bearings 116—116. This element supports a clutch ring 118, carrying a clutch band 119.

Since the clutches form no part of the invention described and claimed in this application, it is believed unnecessary to show and describe the clutch details. Generally described, a clutch actuating key 120, mounted in a keyway in the sleeve between the clutches, alternately actuates the clutches for connecting the gears to the splined shaft. This key 120 has feathered ends engaging under the ends of respective levers 121. These levers, when rocked, spread the clutch bands and cause them to grip the internal periphery of the gears. A yoke ring 122 encircles the sleeve and key centrally of the clutches and is fixed to the key so as to slide the key longitudinally when actuated. A yoke 123 (Fig. 9) engages in an annular groove in the yoke ring.

The yoke 123 is fixed on a shifter rod 124 by means of screws 125. The rod is slidably mounted in lugs 126 of the casing. A lever arm 127, bolted to the upper end of a vertical rod 128, has a ball and socket connection with one end of the shaft 124. The vertical rod 128 is journaled for rotation in an upper lug 129 and a boss 130 in the base wall of the casing. The long main control lever 66 (Fig. 15) is fixed to the extended lower end of the shaft 128 and has its knob end extended out to the front of the head just below the spindle speed shifter lever assembly. Accordingly, horizontal movement of the lever 66 controls the delivery and direction of power entering the drill head.

A reversing idler gear 131 is provided in mesh with one of the gears 115. This gear (Figs. 8, 9, and 10) is journaled on a short shaft 132 between spaced bearings of the casing. The power is transmitted from gear 115 through this gear, for the drill return operation, to gear 133, fixed on the splined shaft 134. For the feed and rotation of the drill in boring, a slow speed is obtained through the other gear 115, meshing directly with a large gear 135, fixed to the shaft 134.

Figure 7:
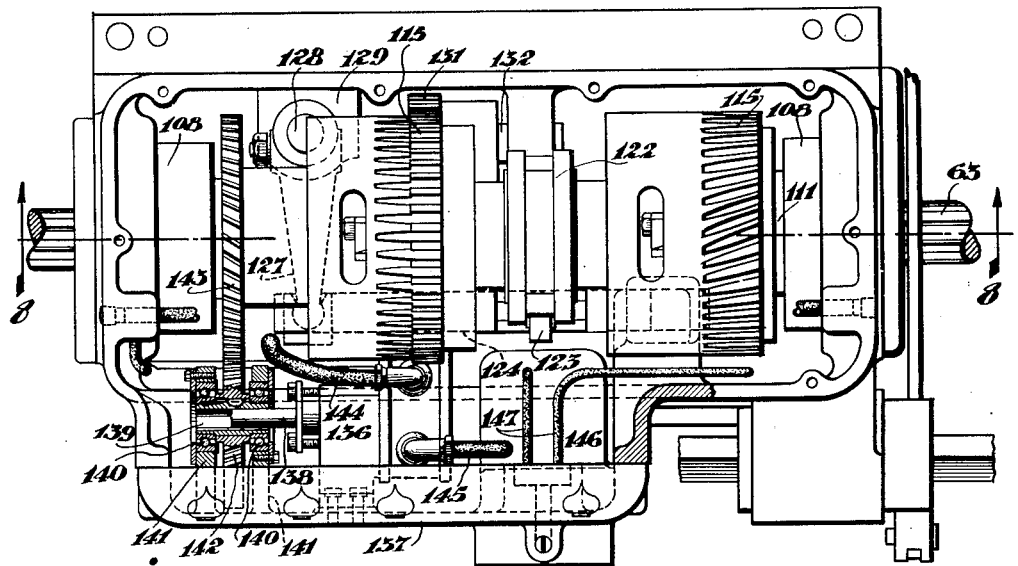
Figure 7 is a top plan view of the rear transmission casing of the head with the cover removed.

The lubricant pump 136 for the head is fixed to a cover plate 137 in an opening in the back of the head. The pump shaft 138 (Fig. 7) extends into a driving sleeve 139, journaled in bearings 140 in spaced lugs 141 of the cover plate 137. The sleeve 139 includes a gear 142 meshing with driving gear 143, keyed to the driving sleeve 106. The pump has an intake conduit 144 extending up from the sump of the head casing, and an outlet tube 145 extending over to a filter 146, also fixed to the cover plate 137. Lubrication lines 147 extend from the filter to the various bearings of the head. Thus, all of the elements of the lubrication system are secured to the cover plate 137 and may be quickly removed as a unit.

*Spindle drive*

As stated, the gears 133 and 135 transmit rapid drill return movement and slower power or drilling movement respectively, as controlled by the main lever 66. They are fixed to the same shaft, namely, 134. Four speed changes are obtained in the upper or rear casing 103, and these four are stepped up to thirty-two speeds (20 R. P. M. to 1600 R. P. M.) in the lower casing of the head at the connection to the spindle.

In addition to gears 133 and 135, three other gears, namely 150, 151, and 152, large to small, are fixed to the splined shaft 134. These gears 133, 135, 150, 151, and 152 are held in a cluster on the shaft. End bearings 153 support the shaft 134 in the end wall and a central wall of the casing.

The shaft 134 includes an extension 154 between the central wall and the other end wall. This extension journals a gear 155, meshing with the gear 143 and forming part of the head traversing gear train, described and claimed in my Patent No. 2,295,516 issued September 8, 1942.

Just below shaft 134 another shaft 156 is rotatably supported in bearings 157—157 in the end wall and central wall of the casing parallel with the shaft 134. This shaft is splined and carries shiftable gears 158, 159, 160 and 161 component to the gears 133, 150, 151, and 152. These gears are in independently shiftable sets of two gears each. In each instance one gear includes a hub 162, upon which the other gear of the set is held by means of a nut 163. The last named gears include annular grooves 164. These grooves 164 are engaged by shifter yokes 165, 166, (Figure 11). The yokes are slidably mounted on a rod 167 and are actuated by means of the cam 68. Each yoke includes a roller 168 engaged in a particular cam track, the arrangement of which is illustrated in Figure 14.

A bevel gear 169 is fixed to the shaft 156 and meshes with another bevel gear 170, fixed to the upper end of a vertical shaft 171. Shaft 171 is journaled in bearings 172—172 in the upper and lower walls of the lower casing 105 (Figure 6). The gear 170 is journaled directly in the upper bearing. A shiftable gear cluster consisting of gears 173, 174 is slidably mounted on the splined portion of shaft 171. The gears are held together rotatively by means of a key 175 on a headed sleeve 176. A nut 177 screwed on the sleeve binds the gears against the inner race of a ball bearing 178 engaged against the head. This gear cluster is shiftable to three positions.

The cluster of two gears just described is shifted by means of a yoke 179 (Figure 11) supported on one end of a pivoted lever 180. The yoke is slidably mounted on a fixed vertical rod 181 and provides a cross-slotted portion engaged by the roller 182 on the end of the lever. The pivot pin 183 for the lever is mounted in a lug 184 of the casing. The other end of the lever carries a roller 185 engaged in a track of the cam 69. A coil spring 186 disposed under pressure between a pin 187 on the lug 184 and the pin 188, carrying the roller 182, counterbalances the weight of the lever, the yoke, and the gear and permits easy shifting. The yoke carries the ball bearing 178 of the cluster and provides a connection in which the gear cluster may rotate and upon which the gear cluster is supported.

Another vertical shaft 189 is journaled in bearings 190—190 in the upper and lower walls of the lower casing. Access to the lower bearings is had by removal of a cover plate 191 fixed on the base wall of the casing over an opening therein. A shiftable cluster of three gears 192, 193 and 194 is slidably mounted on the splined portion of the shaft 189. A yoke 195 provides for shifting of this cluster and is slidably mounted on a vertical shaft 196. The ball bearing 197 carried by the yoke for permitting rotation of the gears is fixed between gears 192 and 193 and these elements are held on the hub of and against gear 194 by means of a nut 198.

A lever 199 is pivoted on a pin 200 on the lug 184 and has a roller 201 at one end engaging a cross-slotted portion of the yoke 195. The other end of the lever carries a roller 202 engaging a cam track of the cam 69. A coil spring 203 under tension between a pin 204 on the lug 184 and the pin 205 carrying the roller 202 is effective for counterbalancing the weight of the gear cluster, the yoke, and the lever. Due to these springs 186 and 203, there is very little resistance to overcome in the operation of rotating the cam and shifting the levers.

Another vertical shaft, namely, 206 (Figure 6) is journaled in upper and lower bearings 207—207 fixed in the upper and lower wall of the lower casing. The lower bearing is accessible through cover plate 191. This shaft has three gears, namely, 208, 209 and 210 fixed thereto. These gears are not shiftable. The small gear 210 is in constant mesh with a bull gear 211 loosely journaled on a double roller bearing 212 on the axis of and around the lower end of the spindle.

A driving sleeve 213 for the spindle is supported and journaled in an upper roller bearing (not shown) in a lug of the casing and a roller bearing 215 adjacent the bearing 212. The spindle is in splined connection within this sleeve 213 by means of keys 216 and provides the conventional chuck for reception of the drill.

A cluster of two gears 217, 218 is in splined connection with the driving sleeve 213 and is shifted by means of a yoke 219. These gears are integral and provide a sleeve portion having an annular groove 220. The yoke 219 engages the groove. The gear 218 is adapted to couple with the internal gear of the bull gear and the other, namely, 217, with the gear 208 for coupling either of these gears with the spindle.

*Speed shift means*

The yoke 219 includes a vertical lug portion 222 bolted to a vertical shift rod 223 slidably mounted in plain bearing lugs 224—224 in the casing (Figure 16). A bell crank 225 is pivotally mounted on a pivot pin 226. This bell crank carries a roller 227 adjacent the end of one arm. This roller engages a cross notch in the rod 223. The other arm of the bell crank has a connection with one end of a slide rod 228. The rod 228 is horizontally slidably mounted in the lugs of a control rod assembly housing or casing 229. The lever 70 is fixed to a vertical stub shaft 230 extending through the top wall of the casing or box 229. The inner end of the shaft carries a lever arm 231 having a pin 232 engaging a cross groove in the rod 228.

A coil spring 233 under tension between a pin 234 on the end of the yoke supporting arm of the bell crank and a pin 235 on the casing, counterbalances the gear cluster, the yoke and the rod, and takes the weight of these parts off the shifting means for the purposes described heretofore. Thus this gear cluster 217—218 has two positions accomplished by shifting the lever 70 alternately to low or high speed range (Figure 17).

The cam 68 is rotatably mounted, being fixed to a shaft 236 journaled in bearings 237—237. A gear 238 is fixed on one end of the shaft and is in mesh with a gear 239 (Figure 12) mounted on a stub shaft 240 fixed in the casing wall. This gear 239 is in mesh with a gear segment 241 attached to a shaft 242 extending across the casing and journaled in bearings 243—243 in its side walls. An arm 244 is fixed to the shaft at the end opposite the gear segment and is connected by a link 244a to a shifter arm 245 rotatively mounted on a shaft 246 journaled in the box 229 (Figure 18). This arm 245 is journaled on spaced ball bearings on the shaft 246 and carries the shifting lever 71 screwed into its forward side.

The cam 69 (Figure 11) is fixed on a shaft vertically disposed in ball bearings 247—247 in the upper and lower walls of the casing. A gear 248 is fixed to the cam shift at its lower end and meshes with a gear segment 249 (Figure 15) journaled about the shaft 128 and includes an arm 250 to which a link 251 is attached. The other end of the link is connected to an arm 252 (Figure 18). This arm 252 is journaled on a shaft 253 on ball bearings 254—254 and includes a segment of bevel teeth 255 meshing with a bevel gear 256 mounted on and fixed to a sleeve 257 journaled on spaced ball bearings 258—258 on the shaft 246. The sleeve has the shifting lever 72 projecting radially therefrom.

The levers 71 and 72 project through respective vertical slots 259—259 in the face of the casing (Figure 17). These slots are spaced apart. The indicator plate 73 is fixed on the face of the casing and has shifting indicia disposed between the slots. Each slot includes a countersunk portion in which a sliding cover plate 260 is disposed for vertical movement as carried by the shifting lever passing through the plate.

The plate 73 carries all of the spindle speed indicia. The low speeds are indicated by enclosed white areas and the high speeds by enclosed black areas. As stated heretofore, the speeds are divided into these two ranges and the lever 70 controls the shift from one to the other. As indicated in Figure 17, the lever 70 has been moved to a position adjacent an enclosed white area 261 at the left hand portion at the top of the indicator plate having been shifted in the direction of the low speed arrow 262 in this panel. For high speeds, the lever is shifted to the right over the enclosed black area 263, including the arrow 264.

For indicating the speeds of the respective ranges, the indicia consists of a series of lines 265 drawn upwardly from the inner edges of the slots. These lines cross each other to form a series of diamond-shaped areas 266. These areas are divided into equilateral triangles by vertical lines 267. Those portions of the diamond-shaped areas on the right-hand side are black and those on the left-hand side are white. Both ranges of speeds read from left to right down each inclined row of diamond-shaped panels. Just below each lever and on the cover plates 260 is an arrow 268 pointing angularly upwardly in parallelism with the lines 265.

As the levers are set in the drawings, Figure 17, the speed of 20 R. P. M. is indicated since 20 R. P. M. is the only panel section toward which both arrows are pointed. The operator reads the white panels for the reason that the lever 70 is set in the low range of speeds. The operator may very quickly shift the spindle speed from 20 R. P. M. to 193 R. P. M., that is change from one range to the other by moving the lever 70 to the right into the high speed zone. The spindle will then be driven at 193 R. P. M. for the arrows of the shifter levers 71 and 72 both point to the black areas indicating 193 R. P. M. Assuming the lever 70 to be in the low speed range, a shift can be made from 20 R. P. M. to 31 R. P. M. by moving the lever 71 downwardly into alignment with the last inclined row of areas at which point its arrow will point at 31. Also, as another example, the operator may shift from 20 R. P. M. to 109 R. P. M. by moving the right-hand lever 72 into alignment with its last inclined row of areas whereupon both arrows will point at 109 in this row.

As may be evident from the speed panel, thirty-two speeds are possible. Four speeds are delivered to shaft 156 through the four sets of gears. Thus, shaft 171 receives four speeds, shaft 189 eight speeds, shaft 206 sixteen speeds, and the spindle drive sleeve thirty-two speeds. Three positions are provided at shaft 171 (Figure 6) since the gears 173 and 174 may move either with the gears 192 and 193 or these respective sets of gears may be moved independently. When gear 192 is meshing with gear 209 and gear 174 with 193, gear 173 may be shifted to mesh with gear 192. Thus the speeds available at shaft 206 through gear 209 are eight. When gear 194 is in mesh with gear 208 and gear 193 with gear 174, gear 173 may be shifted one notch higher to mesh again with gear 192. Thus the speeds available at shaft 206 through gear 208 are eight making a total of sixteen speeds either passing through gear 210 to the bull gear 211 to the spindle, or through gear 208 through gear 217 to the spindle for a total of thirty-two speeds.

Figure 8:
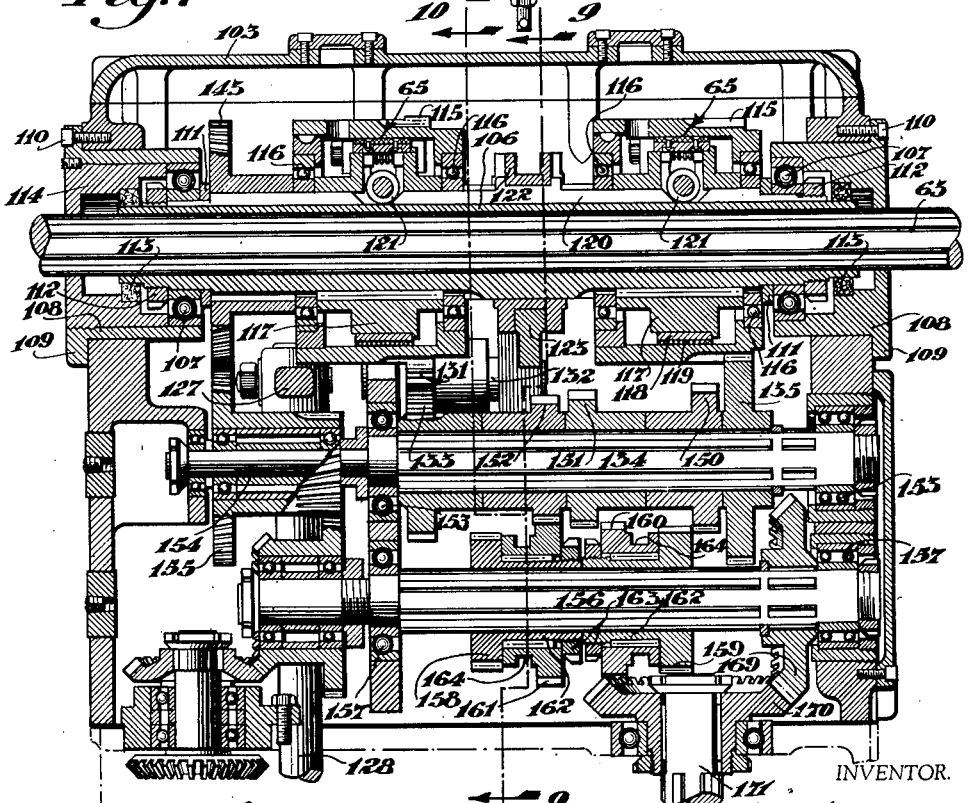
Figure 8 is a sectional view taken on line 8—8, Figure 7, illustrating the transmission extending from the drive shaft toward the base of the head.

The drawing shows the system effective for delivering the lowest speed to the spindle, namely 20 R. P. M. (see Figure 17). To produce the mesh of gears necessary for this speed, the levers are set as indicated and the cams rotated so as to shift gears into the following meshing arrangement. The upper cam 68, actuated by shift lever 71, shifts gear 161 into mesh with gear 152 leaving the other cluster of gears 159, 160 in neutral (Figure 8). Gear 194 is engaged with gear 208 (Figure 6) by means of the lower cam 69 through lever 180 actuated by shift lever 72. Lever 72, also through the lower cam, actuates gear 173 to cause it to mesh with gear 192. Lever 70 has moved gear 218 into coupling engagement with the internal gear of the bull gear. It is not believed necessary to trace out each of these shifts.

For example, the operator may jump the speed from 20 R. P. M. to 1600 R. P. M. if desired. In this event, rotation of the upper cam 68 shifts the gear 158 into mesh with the gear 133 (Figure 8) and maintains the other cluster of gears 159, 160 in neutral. The other cam 69 is effective for moving gear 192 into mesh with gear 209 and gear 174 into mesh with gear 193 (Figure 6). At the same time, the range control lever 70 has been moved to the high speed range which uncouples the bull gear from the spindle and connects the spindle through gears 208 and 217.

Now, each of the shift levers 70, 71 and 72 are provided with detent means for accurately establishing the various positions. Lever 70 has only two positions, that is, low or high speed. The shaft 230, to which this lever 70 is connected, carries a detent arm 270 providing two detent grooves 271 in its end. A roller 272, carried by a swinging pivoted detent arm 273, is held against the end of the arm containing the detent grooves by means of a coil spring 274 under tension between the roller carrying end of the arm and a stud 275 fixed to the casing. Thus, the roller may snap into either one of the grooves for definitely fixing the predetermined shifted position of the lever 70.

The lever 72 provides four positions, each of which is adapted to place the transmission in four different speeds dependent upon the position of the other lever 71 which also has four positions. For this purpose, the gear (Figure 20) actuated by the lever 72 includes a flange 276 providing four detent grooves or notches 277. A bell crank 278 is pivotally mounted in the casing on a pivot pin 279. One arm 280 of this bell crank carries a roller engaging the notches successively and the other has its end connected to a lug 281 of the casing by means of a coil spring 282 under tension, effective for urging the roller 283 against the grooves.

The other lever 71 has its operating arm provided with a series of four notches engaged by a detent means of the same nature as that just described. Thus, the two levers 71 and 72, providing four positions apiece, provide sixteen positions in all and these sixteen positions are doubled by means of the lever 70.

The casing, which carries the levers and dial, also carries the hand wheel 87 for hand traverse of the head along the arm and the control switches 91, 91 for the column clamp.

The driving sleeve 213 for the spindle is journaled in an upper roller bearing (not shown) in the lug of the casing and the roller bearing 215 adjacent the double bearing 212. The spindle 67 is in splined connection within this sleeve by means of keys 216 and provides the conventional chuck for reception of the drill. The double bearing 212 is supported on the boss 286 of the lower wall of the casing and held there by means of a collar 281 engaging the top of the bearing. This collar 287 is screwed on a sleeve 288 disposed in the boss and has a headed lower end seated in a countersink in a cover plate 289 which encircles the lower end of the driving sleve. A ring 290 is secured by bolts 291 to the under side of the gear and holds the gear on the bearing. The driving sleeve rests on the bearing through a shoulder. A nut 292 on the sleeve engages the bearing against the shoulder and secures the packing 293 in place. Additional packing, shown generally at 294, seals the spindle driving means for preventing leakage of oil from the head.

The spindle feed transmission mechanism, shown in the drawings hereof, conjointly with the speed control mechanism is fully disclosed and claimed in my Patent No. 2,384,745, issued September 11, 1945. Attention also is directed to Patent No. 2,278,262, issued March 31, 1942 which discloses and claims the adjustable counterbalancing mechanism employed for accommodating tools of various weights in the spindle.

Having described my invention, I claim:

1. Operating means for the spindle of a radial drill including a set of driving gears extending from the power source to the spindle; a lever for shifting the gears into two ranges, additional levers for changing to speeds within the ranges, a gear shifting cam operated by each of said additional levers, and means adjacent each lever for indicating the range and the specific speed.

2. A drill spindle driving means including a driving gear train; a range control lever shiftable from low to high speed range or vice versa, specific speed control levers, an indicator panel having light and dark areas for indicating the low and high speed ranges, said specific speed control levers operating in spaced parallel paths, diamond shaped panels having light and dark halves between said last-named levers, said panels defined by angularly disposed criss-cross lines, and angularly disposed indicating arrows carried by the last-named levers whereby the speed at which the transmission is driven may be determined by reading the panel toward which both arrows point noting the speed indicated in that half of this panel corresponding to the shade at which the range control lever is positioned.

3. In a spindle transmission mechanism including a variable gear transmission; a range control lever, control levers for the speeds within the ranges, an indicator panel having light and dark zones indicating the respective ranges, the last-named levers carrying indicator arrows, a diamond shaped area between these levers subdivided into small diamond shaped areas by crossed lines parallel to the sides of the diamond shaped area and providing rows of small diamond shaped areas in the diamond shaped area in the line of direction indicated by the arrows, the levers shiftable to cause the arrows to point along any selected rows whereby the subdivided area pointed to by both the arrows indicates the speed at which the levers are set.

4. In a spindle operating means including a gear transmission; a lever for shifting from a low speed range to a high speed range or from a high range to a low range, levers for shifting gears after said first-named lever has been moved to either high speed range or low speed range, said latter levers movable in spaced parallel paths and an indicator panel disposed between said latter levers, said panel carrying angularly arranged lines, said lines overlapping to form diamond shaped areas carrying the speed indicia.

5. In a spindle operating transmission including a series of gears; means for shifting said gears consisting of a horizontally movable lever for shifting from low to high speed ranges or vice versa, a pair of levers for shifting to speeds within the ranges, said latter levers disposed for movement in spaced parallel paths and including indicator arrows angularly disposed, and a panel between the latter pair of levers including speed indicia arranged in criss-crossed rows respectively disposed at the same angles as the arrows whereby the arrows jointly indicate a single indicia and thus indicate the speed at which the levers are set.

6. In a spindle driving apparatus including a variable speed transmission; a range changing lever, speed change levers, and a panel having panels of light and dark shades in the respective ranges, said panels arranged in angular criss-crossed arrangement between the later levers and the levers movable with respect to the ends of the rows for indicating the respective rows and the particular speed by the coincidence of the rows to which the levers are respectively adjacent.

7. In a spindle driving head a set of horizontally shiftable gears, a cam for shifting said gears, a lever for operating said cam, a set of vertically shiftable gears driven by said first set of gears, springs respectively sustaining said last-named gears, a cam for shifting said last-named gears, a lever for operating said cam, range change gears for connecting said last-named set of gears to the spindle, a range change lever for shifting said range change gears, said three levers arranged adjacently at the base of the head, and a panel relative to which said levers move, containing the speed indicia in position where it is indicated by the positions of the levers.

WILLIAM G. HOELSCHER.

REFERENCES CITED

The following references are of record in the file of this patent:

UNITED STATES PATENTS

| Number | Name | Date |
| --- | --- | --- |
| 2,384,745 | Hoelscher | Sept. 11, 1945 |